United States Patent [19]

Siegel

[11] 4,019,387
[45] Apr. 26, 1977

[54] TEMPERATURE COMPENSATED LIQUID LEVEL TRANSMITTER

[75] Inventor: William A. Siegel, Norristown, Pa.

[73] Assignee: Fischer & Porter Co., Warminster, Pa.

[22] Filed: Apr. 24, 1975

[21] Appl. No.: 571,311

[52] U.S. Cl. ................................................ 73/299
[51] Int. Cl.$^2$ ...................................... G01F 23/16
[58] Field of Search ............ 73/299, 449, 454, 393, 73/407 R

[56] References Cited

UNITED STATES PATENTS

| | | | |
|---|---|---|---|
| 1,935,564 | 11/1933 | Christie et al. | 73/449 X |
| 2,087,494 | 7/1937 | Annin | 73/393 X |
| 2,887,881 | 5/1959 | Jones | 73/299 X |
| 3,038,336 | 6/1962 | Peters | 73/299 |
| 3,140,613 | 7/1964 | Hasegawa | 73/393 X |
| 3,479,865 | 11/1969 | Sonnenberg et al. | 73/299 |
| 3,610,042 | 10/1971 | Brosius, Jr. | 73/299 |

FOREIGN PATENTS OR APPLICATIONS 543,515  7/1957  Canada ................................. 73/454

Primary Examiner—Richard C. Queisser
Assistant Examiner—John S. Appleman

[57] ABSTRACT

A liquid level transmitter in which the level of liquid in a tank is detected by a sensor formed by a housing attached to the tank over an opening therein, the housing having a fill chamber defined by a sensing diaphragm which is exposed to the liquid in the tank and an insert incorporated within the housing and spaced from the diaphragm. The sensor housing is joined by a support tube to the body of a force balance meter which includes a pivoted force beam whose lower extremity is mechanically linked to a force measuring diaphragm disposed in a diaphragm chamber. The fill chamber of the sensor communicates with the diaphragm chamber of the meter by way of a capillary extended through the coupling tube. The fill chamber, the capillary and the diaphragm chamber contain hydraulic fluid, whereby tank liquid pressure imposed on the sensing diaphragm is transferred hydraulically to the force measuring diaphragm to deflect the force beam. In order to compensate for the effect of temperature on the volume of the fill in the fill chamber, the insert is formed of a metal having a low coefficient of expansion relative to that of the sensor housing whereby the volume of the fill chamber varies in proportion to changes in the volume of the fill.

3 Claims, 3 Drawing Figures

Figure 1:
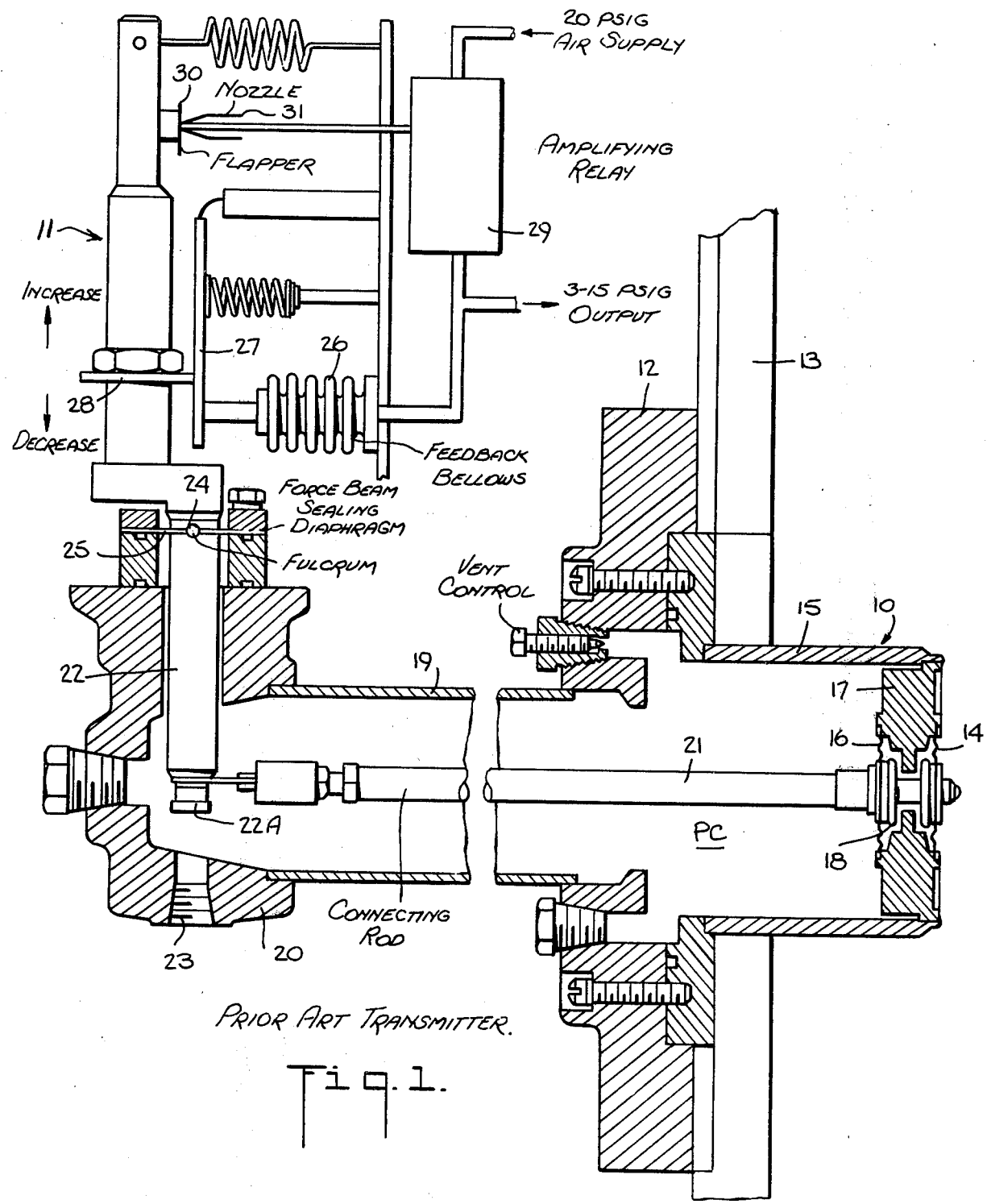

Fig. 1. Prior Art Transmitter.

TEMPERATURE COMPENSATED LIQUID LEVEL TRANSMITTER

BACKGROUND OF INVENTION

This invention relates generally to transmitters which detect the level of liquid in a tank to produce a signal proportional thereto, and more particularly to a liquid level transmitter that is compensated for changes in temperature.

Liquid level transmitters are known which operate on the force balance principle, the transmitter being directly bolted onto the tank containing the liquid. The fluid level in either an open tank or a closed tank under pressure or vacuum is detected by a differential pressure capsule assembly which senses the difference between the weight of the liquid (level) on both sides of the capsule, and converts it into a force that is transmitted by a connecting rod to the lower extremity of a force beam. One commercially-available liquid level transmitter of this type is manufactured and sold by Fischer & Porter Co. of Warminster, Pa., this instrument being described in the Fischer & Porter Instruction Bulletin for Series 13D3493 "Pneumatic Level Transmitter" (June 1969).

In the Fishcer & Porter liquid level transmitter and in similar transmitters manufactured by other companies, the differential capsule assembly includes a pair of coupled diaphragms which define a fill space containing a hydraulic fluid that provides a non-compressible back up under high static pressures. The outer diaphragm is exposed to the liquid in the tank, whereas the inner diaphragm is exposed to atmospheric or relatively low pressures. The coupled diaphragms are linked to the lower extremity of the force beam by a connecting rod passing through a support tube which joins the housing of the capsule assembly with the body of the force balance meter, the support tube defining the low pressure process chamber. Thus the force on the diaphragms in response to the difference in pressure is transferred by the rod to the beam to deflect the beam accordingly. The force applied to the beam is converted by the force balance transducer into a signal proportional thereto.

Thermal expansion of the fill in the fill space between the diaphragms of the capsule produces a force that is imposed on both diaphragms. Since the diaphragms are matched and have equal areas and the force is applied equally and in opposition to both diaphragms, the force is cancelled and the capsule response is independent of variations in fill temperature.

In exsiting types of liquid level transmitters, the mechanical coupling between the differential capsule assembly and the force beam gives rise to a serious source of error.

The metal connecting rod extending between the diaphragms and the force beam is disposed within the low pressure process chamber defined by the metal support tube joining the housing of the capsule assembly to the meter body. The temperature of this rod is often at a temperature which is distinctly at variance with the temperature of the support tube. The reason for this is that the support tube responds not only to the process temperature to which the rod is also exposed, but to ambient temperatures as well. When, therefore, the rod and the support tube are subjected to different temperatures, the mechanical coupling between the diaphragms and the force beam will change length due to the coefficient of expansion of the metals.

This change in length, multiplied by the system gradient, generates a force which, when compared to the full scale operating force, will determine the magnitude of temperature error. The adverse effect of temperature changes on the support tube can readily be observed, for when an operator's hand is placed on the support tube to impart body heat thereto, there is a distinct shift in the output signal.

In order to minimize the influence of temperature on the coupling in a liquid level transmitter between the level sensor and the meter body, it is known to replace the mechanical coupling with a hydraulic coupling in the form of a flexible capillary tube extending between the fill space in the assembly and a measuring diaphragm in the meter, this diaphragm being linked to the force beam. With a hydraulic coupling of this type, changes in the length of capillary relative to that of the support tube have virtually no effect on the performance of the coupling. But should the process heat up the fill between the diaphragms of the differential assembly, the resultant expansion in the fill will generate a pressure proportional to the fluid volume and inversely proportional to the diaphragm compliance, thereby simulating a change in liquid level and producing a spurious signal.

SUMMARY OF INVENTION

In view of the foregoing, it is the main object of this invention to provide a liquid level transmitter which is temperature-compensated to produce an output signal that faithfully reflects the level of liquid in the tank or vessel to which the transmitter is responsive.

More particularly, an object of this invention is to provide a liquid level transmitter having a sensor which detects the level of liquid in a tank, the sensor including a hydraulic fill chamber whose physical dimensions are varied as a function of temperature to alter the internal volume of the chamber in proportion to changes in fill pressure occurring by reason of changes in fill temperature, thereby rendering the sensor insensitive to temperature variations.

Yet another object of this invention is to provide an efficient and reliable liquid level transmitter wherein a temperature-compensated sensor responsive to liquid level cooperates with a transducer to produce a signal proportional to liquid level.

Briefly stated, these objects are attained in a liquid level transmitter whose sensor includes a housing having a fill chamber defined by a sensing diaphragm which is exposed to liquid in the tank and an insert incorporated in the housing and spaced from the diaphragm. The sensor housing is joined by a support tube to the body of a meter whose pivoted beam is mechanically linked to a measuring diaphragm disposed in a diaphragm chamber.

The fill chamber of the sensor communicates with the diaphragm chamber of the meter body by way of a capillary extending through the coupling tube. The fill chamber, the capillary and the diaphragm chamber contain hydraulic fluid, whereby the pressure of tank liquid imposed on the diaphragm of the sensor is transmitted hydraulically to the measuring diaphragm to apply a torque to the force beam.

In order to compensate for the effect of temperature on the volume of the fill in the fill chamber, the insert is formed of a metal having a low coefficient of expansion relative to that of the sensor housing whereby the volume of the fill chamber varies in proportion to changes in the volume of the fill.

OUTLINE OF DRAWING

Figure 2:
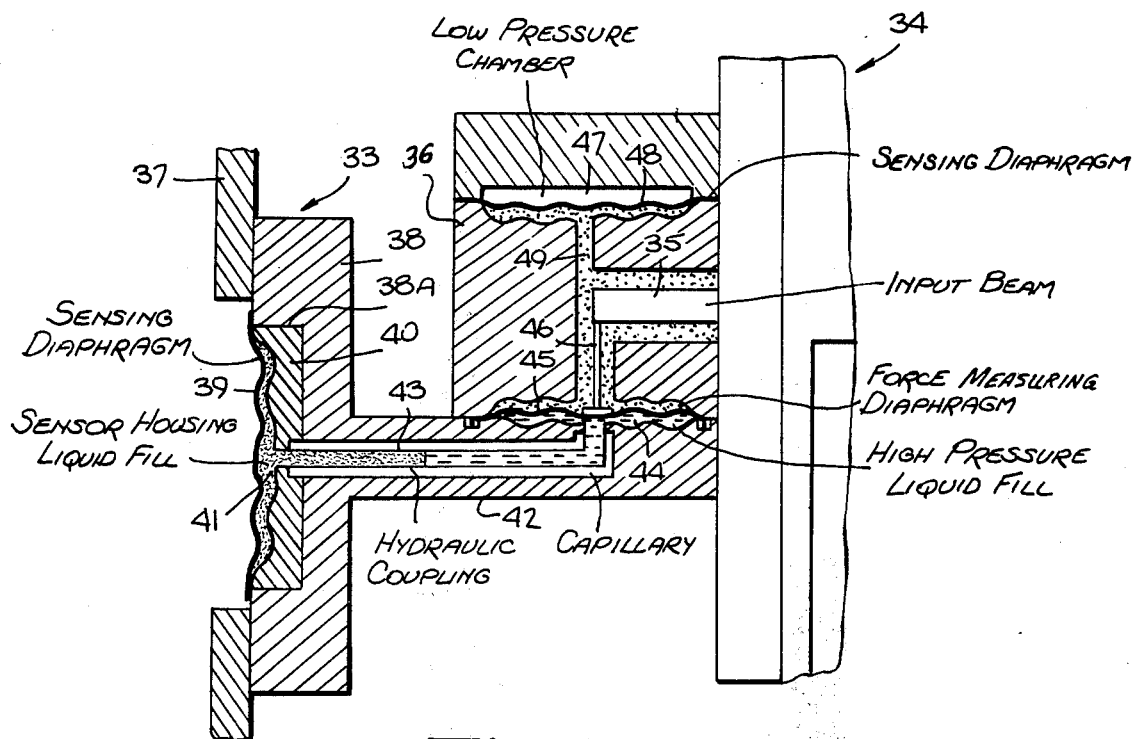
Figure 3:
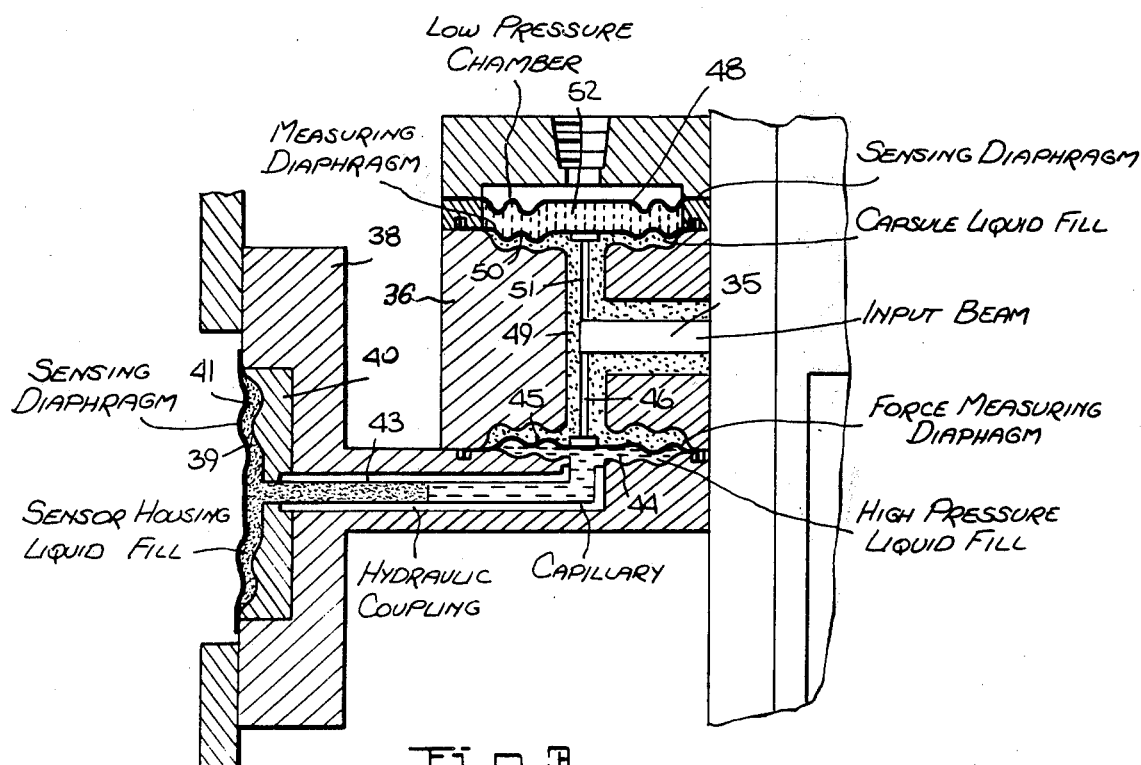

For a better understanding of the invention as well as other objects and further features thereof, reference is made to the following detailed description to be read in conjunction with the accompanying drawing, wherein:

FIG. 1 schematically illustrates a prior art form of liquid level transmitter;

FIG. 2 schematically illustrates a first embodiment of a liquid level transmitter in accordance with the invention; and FIG. 3 is a schematic diagram of a second embodiment of the transmitter.

DESCRIPTION OF INVENTION

Prior Art

In order to explain in general terms the structure and function of a liquid level transmitter to indicate why prior art transmitters are sensitive to temperature changes and are subject to error, we shall first describe one known type of transmitter adapted to produce a pneumatic signal that is a function of liquid level. It is to be understood, however, that the present invention also encompasses transmitters which generate electrical signals as a function of liquid level.

Referring now to FIG. 1, there is shown a liquid level transmitter having a differential capsule assembly, generally designated by numeral 10, which cooperates with a force balance transducer, generally designated by numeral 11. Capsule assembly 10 is provided with a flange 12 which bolts directly on the wall 13 of the tank whose liquid level is to be measured, the assembly having a measuring diaphragm 14 exposed to the liquid in the tank. The pressure produced by the liquid level in either an open vessel or a closed vessel under pressure or vacuum is converted by the force balance transducer 11 to a proportional pneumatic signal (i.e., 3 to 15 psig).

Measuring diaphragm 14 may be flush with the mounting flange or, as shown, it may be attached to a tubular extension 15 that protrudes from the mounting flange. The extension permits the measuring diaphragm to be flush with the inside of a thick wall tank.

The differential pressure capsule includes a second diaphragm 16 which matches the first diaphragm 14, the diaphragms being mounted in parallel relation on opposing faces of a capsule body 17 to define in the space therebetween a fill chamber 18. Diaphragm 16 is responsive to atmospheric pressure or the pressure in the closed tank within the pressure chamber PC defined by extension 15 and a support tube 19 which joins flange 12 of the capsule assembly 10 to the body 20.

In open-tank liquid level measurement, the low pressure connection 23 in pressure chamber PC is kept open to the atmosphere, whereas when the level of a closed tank is measured, the static pressure in the tank must be taken into account. In the latter case, the low-pressure connection 23 is coupled by a suitable pipeline to a point in the tank that is higher than the maximum fluid level.

Force beam 22 pivots about a fulcrum 24 located at the center of a horizontal sealing diaphragm 25. An input force proportional to the liquid level is applied to the lower extremity 22A of the force beam which is a fixed distance from the point of fulcrum 24. On the upper side of the fulcrum, a feedback force developed by a feedback bellows 26 is applied to the force beam by way of a range beam 27 and a range adjustment nut 28.

Force beam 22 is in equilibrium when the torques produced by the input force and the feedback force are in balance. The slightest change from the balanced condition will deflect the force beam and activate an amplifying relay 29 by changing the gap between a flapper 30 mounted on force beam 22 and movable therewith and a stationary nozzle 31 coupled to relay 29. Thus the flapper-nozzle assembly acts as a deflection position detector.

The distance from the fulcrum at which the feedback force is applied to the force beam may be set by moving the range adjustment nut 28 along the force beam. The position of the range adjustment nut determines the change in level necessary to produce a full-scale output change.

The detector includes a nozzle supply restriction in addition to nozzle 31 and flapper 30. A change from the balance condition deflects the force beam 22 to alter the air gap of the detector. A fixed rate of air flows through the restriction to nozzle 31; consequently, any variation in the air gap because of the restriction will change the nozzle back pressure. The back pressure increases when the detector gap decreases. Conversely, an increase in the air gap reduces the nozzle back pressure.

Amplifying relay 29 is supplied with air at 20 psig from a regulated supply. The transducer is designed to produce a 12 psi (3–15 psig) change in output pressure for a 3 psi (approximately 3–6 psig) change in nozzle back pressure. Therefore, a 4 to 1 amplification of the nozzle pressure is required to meet the final control element requirements. The pneumatic output pressure (3 to 15 psig) from amplifying relay 29 is fed to the process equipment being controlled, and it is simultaneously returned as feedback to bellows 26.

The operating sequence of the transmitter is as follows:

The pressure produced by the liquid level and the static pressure is applied to one side of the differential capsule assembly 10. Static pressure is applied to the opposing side of the capsule assembly. Since the static pressure is equal and opposite, this force is cancelled. The remaining force is directly proportional to level and is transmitted to one end of the force beam by the connecting rod 21. This applies a torque about the fulcrum 24. The input torque is balanced by a restoring torque applied by the force beam, on the opposite side of the fulcrum due to the feedback system 26. The restoring torque is proportional to the pneumatic output signal. Detector 30–31 senses any deviation from a balanced condition between input torque and restoring torque and changes the output pressure produced by relay 29 to maintain a balanced condition.

Ideally, under these conditions the pneumatic output signal is directly proportional to the differential pressure. The proportionality factor is set by the range adjustment.

But, as noted previously, in actual practice, the mechanical coupling between the differential pressure capsule and the force beam gives rise to a major source of error. Differences in the temperature of the rod and of the coupling tube surrounding the rod result in a change of length of the mechanical coupling. The rod temperature is determined solely by the temperature within process chamber PC, whereas the support tube which is also exposed to ambient conditions will usually assume a very different temperature. Since the change in length of the mechanical coupling affects the output signal of the transmitter, the signal has a spurious component and does not accurately reflect the liquid level.

First Embodiment:

Referring now to FIG. 2, there is shown a preferred embodiment of a liquid level transmitter, the transmitter being constituted by a sensor, generally designated by numeral 33, and a force balance transducer, generally designated by numeral 34, and including a pivoted force beam 35 supported within a meter body 36.

Sensor 33, which is mounted on wall 37 of a tank whose liquid level is to be measured, includes a housing 38 which is bolted or otherwise secured to the wall to cover an opening therein. Covering a well 38A formed in housing 38 is a sensing diaphragm 39 whose periphery is welded or otherwise attached to the bank of the well, the face of the diaphragm being exposed to the liquid to be measured.

Seated within the well is an insert 40 whose face has corrugations formed therein which conform to the corrugations of the diaphragm, the face of the insert being spaced from the diaphragm to define a fill chamber 41.

Housing 38 of sensor 33 is joined to body 36 of the force balance transducer by a support tube 42 within which is extended a capillary 43. The capillary communicates between the sensor fill chamber 41 and a high pressure chamber 44 formed in the meter body, this chamber being provided with a force-measuring diaphragm 45. This diaphragm is mechanically linked by a pin 46 to the lower extremity of force beam 35.

Symmetrically arranged with respect to high pressure chamber 44 in the meter body relative to the force beam passage is a low pressure chamber 47, provided with a second sensing diaphragm 48. Space 49, between force-measuring diaphragm 45 and second sensing diaphragm 48, constitutes a fill chamber which contains the low-pressure hydraulic fluid.

Fill chamber 41 in the sensor, high pressure chamber 44 in the meter body, and capillary 43 interconnecting these chambers, all contain the high-pressure chamber hydraulic fluid. Thus in this hydraulic coupling arrangement, pressure of liquid in the tank is transferred hydraulically to force-measuring diaphragm 45, and is imposed as an input force on the force beam. The feedback bellows and all of the other elements of the meter, which are illustrated in FIG. 1, are omitted in FIG. 2 to simplify the showing.

The use of a hydraulic coupling in the embodiment of FIG. 2, in lieu of the mechanical coupling included in the prior art instrument shown in FIG. 1, overcomes the shortcomings of the latter. Because the capillary contains a comparatively insignificant volume of fill fluid, the relative changes in the length of the capillary and the surrounding support tube have no measurable effect on the performance of this transmitter. Good temperature effects from this design are a function of the matched volumes of fill fluid in the low-pressure fill chamber 49 and high pressure fill chamber 44 and the matched compliance (volumetric displacement/unit of pressure) of the two sensing diaphragms 39 and 48. By meeting this requirement, the instrument will perform satisfactorily, provided the process temperature is the same in both the high and low pressure chambers.

However, in level measurement, the low pressure chamber is often open to the atmosphere (open tank). Even when pressurized (closed tank), the process is dead-ended, so that the high and low pressure fill fluids are at different temperatures. For example, if the process raises the temperature of the high pressure fill fluid, the fluid will then expand and generate a pressure, which is a function of the volume of the fluid and diaphragm compliance, thereby simulating a level change and generating a spurious signal.

In the arrangement shown in FIG. 2, the liquid level transmitter is rendered insensitive to the effect of temperature on the volume of fluid in fill chamber 41 of the sensor. For this purpose, insert 40, which is seated in housing 38, is preferably formed of a metal such as INVAR (an iron-nickel alloy), having a very low thermal coefficient of expansion, whereas the material of the housing, which is preferably stainless steel, has a much higher coefficient of expansion. The dimensions of the housing and of the insert are such that, taken in conjunction with their dissimilar coefficients of expansion, the internal volume of fill chamber 41 will increase or decrease in direct proportion to the expansion or contraction of the volume of hydraulic fluid contained in the fill chamber, thereby compensating for the effect of temperature on the volume of fill.

The coefficient of expansion of INVAR, the preferred material for the insert, is less than $1.0 \times 10^{-6}$ in/in/° F, whereas that of stainless steel, the preferred material for the housing, is greater than $9.0 \times 10^{-6}$ in/in/° F. It will be appreciated that other dissimilar material combinations and dimensions may be used for the same purpose.

Second Embodiment:

In this arrangement, which is shown in FIG. 3, the sensor is the same as that in FIG. 2, and its fill chamber 41 is hydraulically coupled through a capillary to high pressure chamber 44 in the body of the force balance meter, thereby applying a force reflecting the liquid level in the tank to measuring diaphragm 45 linked to force beam 35. Also in this embodiment, the sensor housing includes an insert having a low coefficient of expansion to compensate for the effect of temperature on the volume of fill in the fill chamber.

However, in this instance, a differential capsule is provided similar to that in FIG. 1, except that the capsule is installed in the meter body, not in the sensor. It will be seen that the differential capsule includes a second measuring diaphragm 50, which is symmetrically arranged with respect to measuring diaphragm 45 relative to the force beam, the second measuring diaphragm being mechanically linked to force beam 35 by a pin 51. The measuring diaphragms have matched areas to equalize any change in internal pressure.

The second measuring diaphragm is disposed in parallel relation to second sensing diaphragm 48, space 52 therebetween forming a low-pressure fill chamber. Low pressure second sensing diaphragm 48 and the fill volume in low pressure fill chamber 52 must match the compliance of high pressure sensing diaphragm 39 and the fill volume of the external high pressure chamber 44.

While there have been shown and described preferred embodiments of a temperature compensated liquid level transmitter in accordance with the invention, it will be appreciated that many changes and modifications may be made therein without, however, departing from the essential spirit thereof. Thus while the transmitter has been described as adapted to measure the level of liquid in a tank, it may be used to measure other variables such as density and specific gravity.

Also, while the invention has been described in connection with a force balance transducer of the closed-loop type, it is also usable in conjunction with open-loop transducers of the type described in the copending application of Masahiro Kazahaya, entitled "Open-Loop Differential-Pressure Transmitter," Ser. No. 579,712, filed May 27, 1975.

I claim:

1. In a transmitter for generating a signal proportional to the level of liquid in a tank or other vessel, the combination comprising:
   A. a meter having a pivoted force beam and producing an output signal that depends on the force applied to the beam,
   B. A sensor for detecting said liquid level and having a housing attachable to the wall of said tank, said housing having a well therein covered by a sensing diaphragm whose face is exposed to the liquid in the tank through an opening in said wall and whose periphery is bonded to the housing, and an insert seated in said well, the face of said insert being spaced from the diaphragm to define a fill chamber containing hydraulic fluid, the volume of hydraulic fluid in said fill chamber varying as a function of temperature,
   C. hydraulic means coupling said fill chamber to said beam whereby the force produced by the pressure of the liquid on said diaphragm is applied by the hydraulic fluid to said beam, said hydraulic means including a high-pressure chamber formed in the body of said meter and covered by a force-measuring diaphragm mechanically linked to the lower end of said force beam, and a capillary communicating between the fill chamber and said high-pressure chamber, said capillary being disposed within a support tube extending between the housing of the sensor and the meter body, said insert being formed of a metal having a coefficient of expansion that is low relative to the material of said housing, whereby variations in temperature produce changes in the dimensions of the housing relative to that of the insert and result in changes in the volume of said fill chamber to an extent compensating for concurrent changes in the volume of the hydraulic fluid, thereby rendering the force applied to said beam independent of said variations in temperature,
   D. A static pressure chamber formed in said meter body and covered by a second sensing diaphragm, said static pressure chamber and said high-pressure chamber being symmetrically arranged with respect to the force beam, and a second fill chamber extending between said force-measuring diaphram and said second sensing diaphragm,
   E. a second measuring diaphragm in parallel relation to said second sensing diaphragm to define a fill space, and
   F. a pin linking said second measuring diaphragm to said force beam.

2. In a transmitter as set forth in claim 1, wherein said insert is formed of an iron-nickel alloy.

3. In a transmitter as set forth in claim 1, wherein said housing is formed of stainless steel.

* * * * *

UNITED STATES PATENT AND TRADEMARK OFFICE
CERTIFICATE OF CORRECTION

PATENT NO. : 4,019,387
DATED : April 26, 1977
INVENTOR(S) : William A. Siegel

It is certified that error appears in the above-identified patent and that said Letters Patent are hereby corrected as shown below:

Column 1, line 53, "exsiting" should have read -- existing --

Column 6, line 2 "atmospher" should have read -- atmosphere --

Column 7, line 10 "May 27" should have read -- May 21 --

Signed and Sealed this sixteenth Day of August 1977

[SEAL]

Attest:

RUTH C. MASON
*Attesting Officer*

C. MARSHALL DANN
*Commissioner of Patents and Trademarks*